(No Model.)

A. J. SPICER.
WHEEL FASTENING DEVICE FOR CAR AXLES.

No. 387,459. Patented Aug. 7, 1888.

WITNESSES:

INVENTOR:

BY

ATTORNEYS.

UNITED STATES PATENT OFFICE.

ANDREW J. SPICER, OF PORTLAND, OREGON, ASSIGNOR TO HIMSELF AND JAMES E. HASELTINE, OF SAME PLACE.

WHEEL-FASTENING DEVICE FOR CAR-AXLES.

SPECIFICATION forming part of Letters Patent No. 387,459, dated August 7, 1888.

Application filed February 25, 1888. Serial No. 265,241. (No model.)

*To all whom it may concern:*

Be it known that I, ANDREW J. SPICER, of Portland, in the county of Multnomah and State of Oregon, have invented a new and useful Improvement for Fastening Car-Wheels to their Axles, of which the following is a full, clear, and exact description.

The object of this invention is to so attach car-wheels to their axles that the two wheels carried by an axle will be able to revolve independently, and, if necessary, in opposite directions; and to this end the invention consists of an axle, one of the wheels of which is held thereto by a metallic ring or collar, which is cast to place after the wheel has been loosely applied to the axle, the wheel-hub and the axle-bearing being provided with registering-grooves, within which grooves the molten metal constituting the locking-key is poured.

Reference is to be had to the accompanying drawings, forming a part of this specification, in which similar figures of reference indicate corresponding parts in both the views.

Figure 1:
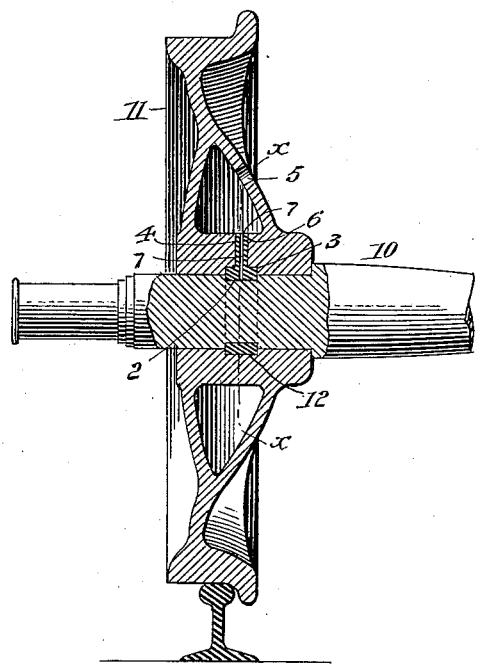
Figure 2:
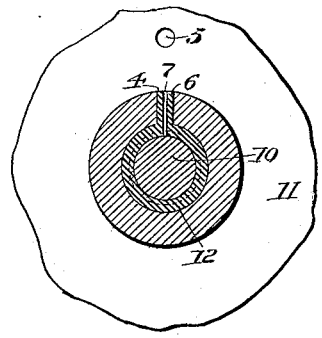

Figure 1 is a central sectional elevation of a wheel and axle connected in accordance with my improved fastening, and Fig. 2 is a cross-sectional view taken on line *x x* of Fig. 1.

In the drawings, 10 represents an axle of ordinary construction, except that in the peripheral face of one of the wheel-seats, which in this case forms a bearing for the wheel, there is cut a groove, 2, so located that when the wheel 11 is placed in position upon its bearing a groove, 3, formed in the wheel-hub, will register therewith. A passage, 4, leads from the groove 3 through the hub of the wheel, access being had to the passage by means of an opening, 5, that is formed in the web of the wheel.

In connecting the wheel and axle constructed as above described, the wheel is adjusted to the position in which it is shown in the drawings. Molten metal—such as brass or any other proper metal—is then poured into the passage 4, passing thence into the registering-grooves 2 and 3, and forming an annular key, 12, which will act to hold the wheel against lateral displacement. In order that a lubricating material may be introduced between the key 12 and the peripheral defining-face of the groove 2, I prefer to place a core in the center of the passage 4, and thus form a bore, 6, in the neck 7, within the passage 4. The other wheel of the axle is connected in the ordinary manner.

From the construction described it will be seen that if the wheel 11 be subjected to a strain different from that to which the fixed wheel of the axle is subjected, said wheel 11 will be free to turn upon its bearing, thus avoiding undue wear and tear upon the tread of the wheel at times when the vehicle, supported in part by the axle 10, is passing about a curve.

Having thus described my invention, I claim as new and desire to secure by Letters Patent—

1. The combination, with an axle having an annular groove in its spindle, of a wheel having an annular groove in the inner surface of its hub, registering with the groove in the axle, and a passage leading from the groove through the hub, and a metallic locking-key inserted in the registering groove and provided with a stem projecting into the passage-way and locking the key to the hub of the wheel, substantially as described.

2. The combination, with an axle having a groove, 2, in the peripheral face of one of its wheel-seats, of a wheel in the hub of which there is formed a groove arranged to register with the groove 2, a passage, 4, leading from said groove in the wheel-hub, and a metallic locking-key placed in the registering grooves and formed with a centrally-apertured neck extending within the passage 4, substantially as described.

ANDREW J. SPICER.

Witnesses:
MIKIE L. BERGMAN,
FRED. R. STRONG.